United States Patent [19]
Kwon

[11] Patent Number: 5,408,226
[45] Date of Patent: Apr. 18, 1995

[54] LIQUID CRYSTAL DISPLAY USING A PLASMA ADDRESSING METHOD

[75] Inventor: Ki-duck Kwon, Seoul, Rep. of Korea

[73] Assignee: Samsung Electron Devices Co., Ltd., Kyungki-do, Rep. of Korea

[21] Appl. No.: 996,154

[22] Filed: Dec. 23, 1992

[30] Foreign Application Priority Data

May 26, 1992 [KR] Rep. of Korea .............. 92-8949

[51] Int. Cl.$^6$ ........................................ G09G 3/00
[52] U.S. Cl. .................................. 345/60; 345/87; 345/94; 345/208
[58] Field of Search ............... 340/750, 769, 771–778, 340/805, 811, 812, 813, 814; 315/169.4; 345/60, 63, 66, 67, 68, 71, 4, 5, 93, 95, 96, 87, 204, 208

[56] References Cited

U.S. PATENT DOCUMENTS

| | | | |
|---|---|---|---|
| 3,601,532 | 8/1971 | Bitzer | 340/805 |
| 4,020,280 | 4/1977 | Kaneko et al. | 340/805 |
| 4,532,505 | 7/1985 | Holz et al. | 340/775 |
| 4,562,434 | 12/1985 | Amano | 345/67 |
| 4,575,721 | 3/1986 | Delgrange et al. | 340/777 |
| 4,652,796 | 3/1987 | Delgrange et al. | 315/169.4 |
| 4,896,149 | 1/1990 | Buzak et al. | 340/771 |
| 5,157,386 | 10/1992 | Uchida et al. | 340/784 |
| 5,175,473 | 12/1992 | Kim | 345/67 |

Primary Examiner—Alvin E. Oberley
Assistant Examiner—Steven J. Saras
Attorney, Agent, or Firm—Leydig, Voit & Mayer

[57] ABSTRACT

A liquid crystal display (LCD) using a plasma addressing method includes a sequentially arranged face plate, intermediary plate, and rear plate separated from each other by predetermined distances; a liquid crystal portion including a liquid crystal material between said face and intermediary plates for displaying an image in accordance with the arrangement of the liquid crystal material; and a plasma portion formed by sealing a discharge gas between the intermediary and rear plates for rearranging the liquid crystal material by adjusting the discharging state of the discharge gas. The LCD has AC voltage-supply parallel column electrodes on the inner surface of the face plate for supplying a constant frequency AC voltage, data signal-supply anodes on the inner surface of the rear plate for supplying data signals, and line scanning signal-supplying cathodes insulated from and at right angles to the data signal-supply anodes on the inner surface of the rear plate for supplying line scanning signals. A driving method of the display is also provided. Both the liquid crystal portion and the plasma addressing portion can be driven by just one driving IC which reduces manufacturing cost and enhances the display's response.

5 Claims, 4 Drawing Sheets

LIQUID CRYSTAL DISPLAY USING A PLASMA ADDRESSING METHOD

BACKGROUND OF THE INVENTION

The present invention relates to a plasma liquid crystal display, and to a liquid crystal display using a plasma addressing method, including a plasma discharge electrode wherein anodes for applying data signals and cathodes for applying line scanning signals are arranged in an X-Y matrix, and a method for driving and grayscale displays.

Along with the need for display media which can effectively display a great deal of information, and the development of the next generation of high-definition televisions (HDTV), flat-panel displays are currently being studied to improve the picture quality of HDTV as well as to realize a full-sized screen. One kind of such flat-panel display is a liquid crystal display using a plasma addressing method, which is constructed by uniting a plasma discharge device and a liquid crystal display of an electric field optical device. In the initial stages of construction, a liquid crystal display using a plasma addressing method is built such that stripe-like data electrodes are formed on the inner surface of a transparent face plate of a liquid crystal portion, and scanning lines are formed in grooves of a plasma addressing portion so as to intersect the stripe-like data electrodes at right angles.

Under this state, a rear plate is tightly fixed to an intermediary plate, so that the groove forms a sealed discharge space into which discharge gas is injected. However, in practical mass production, such a liquid crystal display using a plasma addressing method is difficult to make, due to the fastidious process of manufacturing the groove of the plasma addressing portion.

Therefore, ongoing research into the easy manufacture of a liquid crystal display using a plasma addressing method has continued. As a result, a novel liquid crystal display using a plasma addressing method has developed wherein its discharge electrodes are arranged as an X-Y matrix, and its structure is as follows.

A transparent face plate of a liquid crystal portion and a rear plate are disposed in such a manner so as to be spaced apart from each other by a predetermined distance, column electrodes are formed on the inner surface of the transparent face plate, and liquid crystal is injected between the face plate and an intermediary plate to form a liquid crystal layer. In addition, cathodes for supplying scanning signals are formed on the inner surface of the rear plate while crossing the column electrodes at right angles, and anodes are formed parallel to the column electrodes. FIG. 1 is a diagram for illustrating a method for driving a liquid crystal display using a plasma addressing method with the structure described above.

When a discharge potential on a selected scanning line is created by successively supplying scanning signals to cathodes 23 (that is, so as to conduct), data electrodes 14 positioned over cathodes 23 are supplied with data signals, thereby forming an electric field at the intersecting portions of these electrodes. Thus, the liquid crystal layer at the selected portion is rearranged. Accordingly, light from a background light source (not shown) placed on the rear plate of a discharging portion is formed due to the discharge potential, and then passes through the discharging portion. At this time, all anodes 22 are at ground potential.

In the above-described conventional liquid crystal display using a plasma addressing method, the jointly operating addressing portion and liquid crystal portion are each controlled by its own driving IC, thus decreasing the speed and accuracy of such a liquid crystal display. Moreover, since a driving voltage applied to the liquid crystal portion is low, the intermediary plate must be extremely thin in order to allow for the rearrangement of the liquid crystal in the liquid crystal portion, which utilizes the discharge potential of plasma discharge cells. However, an extremely thin glass plate such as the type currently being used as transparent intermediary plates of the liquid crystal portion is difficult to produce.

Further, in the liquid crystal display using a plasma addressing method having the above-described structure, in order to display gray scale, a data signal is supplied to a column electrode of the liquid crystal portion and a scanning signal is supplied to a cathode of the plasma addressing portion. Hence, a pixel is turned on/off with just two signals, so that a more effective display of the gray scale is difficult.

SUMMARY OF THE INVENTION

It is an object of the present invention to provide a liquid crystal display using a plasma addressing method which can solve the above-mentioned problems.

It is another object of the present invention to provide a method for effectively driving the liquid crystal display using a plasma addressing method.

To achieve the above object of the present invention, there is provided a liquid crystal display using a plasma addressing method including a sequentially arranged face plate, intermediary plate and rear plate each separated by a predetermined distance, a liquid crystal portion formed by injecting liquid crystal between the face and intermediary plates for displaying a picture in accordance with the arrangement of the injected liquid crystal, and a plasma portion formed by sealing a discharge gas between the intermediary and rear plates for rearranging the liquid crystal by adjusting the discharging state of the discharge gas, further comprising:

AC voltage-supply column electrodes parallel to column electrodes on the inner surface of the face plate for supplying a constant AC voltage;

data signal-supply anodes on the inner surface of the rear plate, for supplying data signals; and line scanning signal-supply cathodes insulated from and at right angles to the data signal-supply anodes on the inner surface of the rear plate, for supplying line scanning signals.

To achieve another object of the present invention, there is provided a method for driving the liquid crystal display of a plasma addressing method comprising the steps of:

supplying a constant AC voltage to the parallel column electrodes on the inner surface of the face plate;

supplying line scanning signals to the line scanning signal-supply cathodes between the intermediary and rear plates;

supplying data signals to the data signal-supply anodes insulated from and at right angles to the line scanning signal-supply cathodes; and adjusting the discharging state of the discharging gas by the data signals and line scanning signals, thereby enabling the selective switching of the plasma portion to rearrange the liquid crystal.

BRIEF DESCRIPTION OF THE DRAWINGS

The above objects and other advantages of the present invention will become more apparent by describing the preferred embodiment of the present invention with reference to the accompanying drawings, in which.

DETAILED DESCRIPTION OF THE INVENTION

Figure 1:
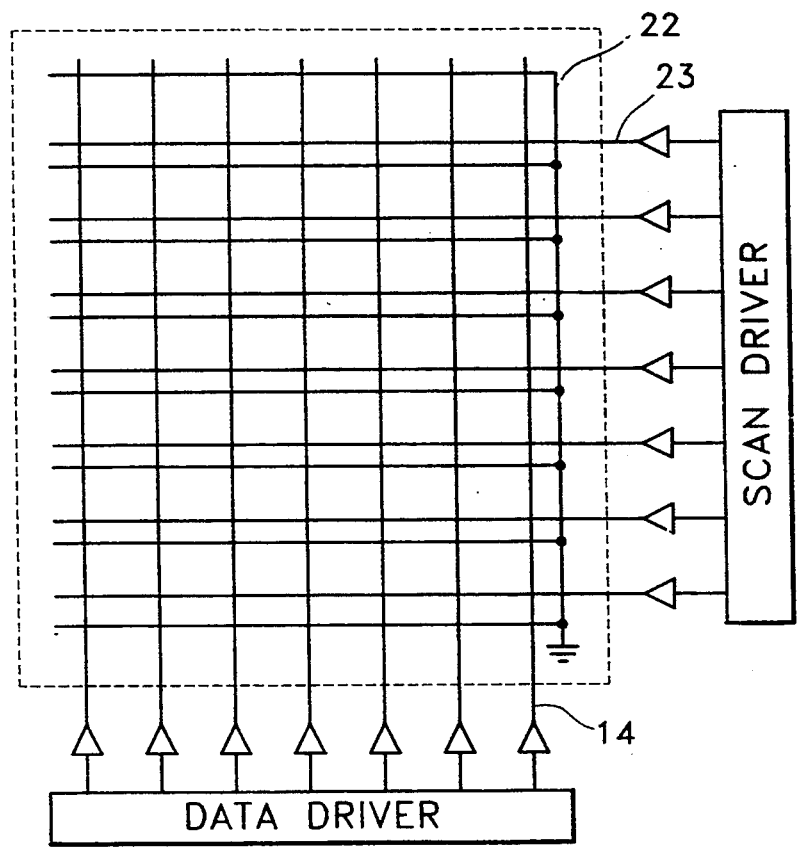
FIG. 1 is a circuit diagram showing a driver for driving a conventional liquid crystal display of a plasma addressing method.
Figure 2:
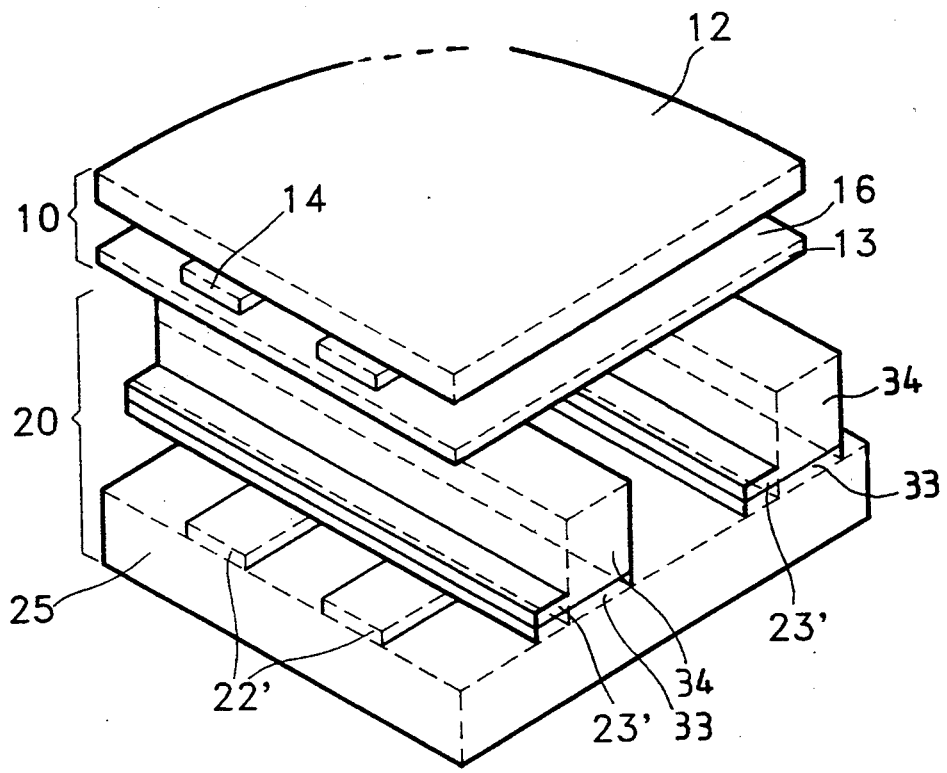
FIG. 2 is a perspective view showing a liquid crystal display of a plasma addressing method according to the present invention.

Referring to FIG. 2, a transparent face plate 12 of a liquid crystal portion 10 and a rear plate 25 are spaced apart from each other by a predetermined distance to shield elements placed between them. Stripe-like constant AC voltage-supply column electrodes 14 for supplying a constant AC voltage are arranged parallel with one another on the inner surface of transparent plate 12. Also, a liquid crystal layer 16 is formed by injecting a liquid crystal material between transparent face plate 12 and an intermediary plate 13. Using intermediary plate 13 as a reference, data signal-supply anodes 22' are disposed on the substrate 25 opposite the liquid crystal layer to supply data signals, and line scanning signal-supply cathodes 23' are disposed on the inner surface of rear plate 25 to supply line scanning signals and are insulated from and form right angles with the data signal-supply anodes. Insulating layers 33 contacting the data signal-supply anodes 22' insulate the signal-supply cathodes 23' from the anodes 22'. Insulating barriers 34 are disposed between the rear plate 25 and the intermediate plate 13. The signal-supply cathodes 23' are disposed on respective insulating layers 33.

Figure 3:
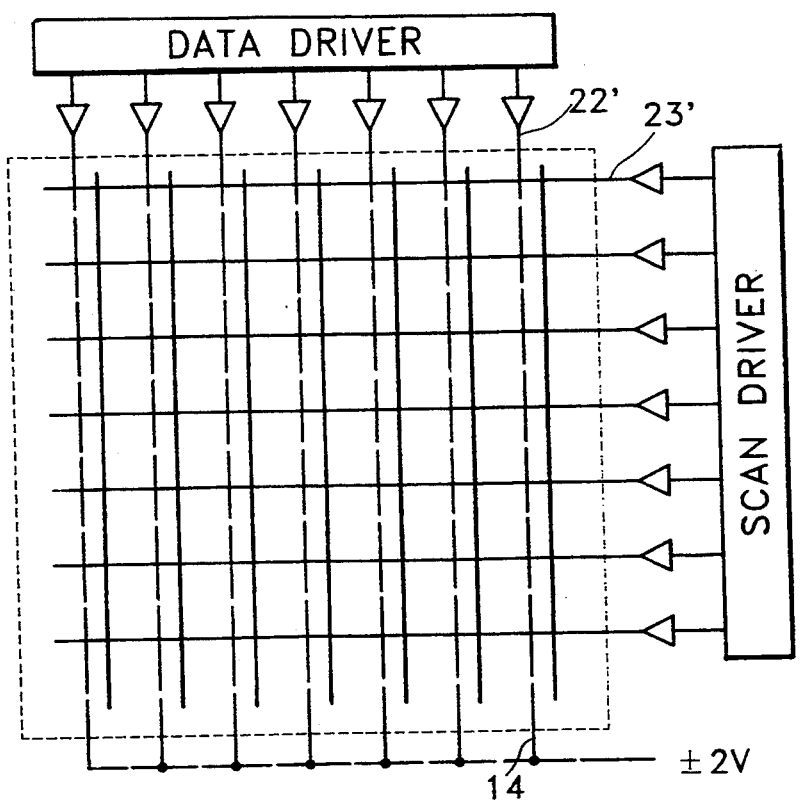
FIG. 3 is a circuit diagram showing a driver for driving a liquid crystal display of a plasma addressing method according to the present invention.

FIG. 3 is a circuit diagram for driving the liquid crystal display of a plasma addressing method according to the present invention.

Referring to FIG. 3, line scanning signal-supply cathodes 23' of a plasma discharge portion 20 are supplied with a scanning signal from a scan driver, and data signal-supply anodes 22' are supplied with a data signal from a data driver. In the plasma discharge portion 20, discharge selectively occurs at each point where a line scanning signal-supply cathode 23' and a data signal-supply anode 22' intersect each other, in accordance with the supplied signals. Therefore, the liquid crystal layer on the upper portion is rearranged, and thus light generated from a background light source (not shown) positioned on the rear surface of the discharge portion passes therethrough. At this time, to extend durability, column electrodes 14 of the liquid crystal portion are supplied with an AC voltage whose period consistently corresponds to a frame, and which can be adjusted as desired (e.g., ±2 V).

Figure 4:
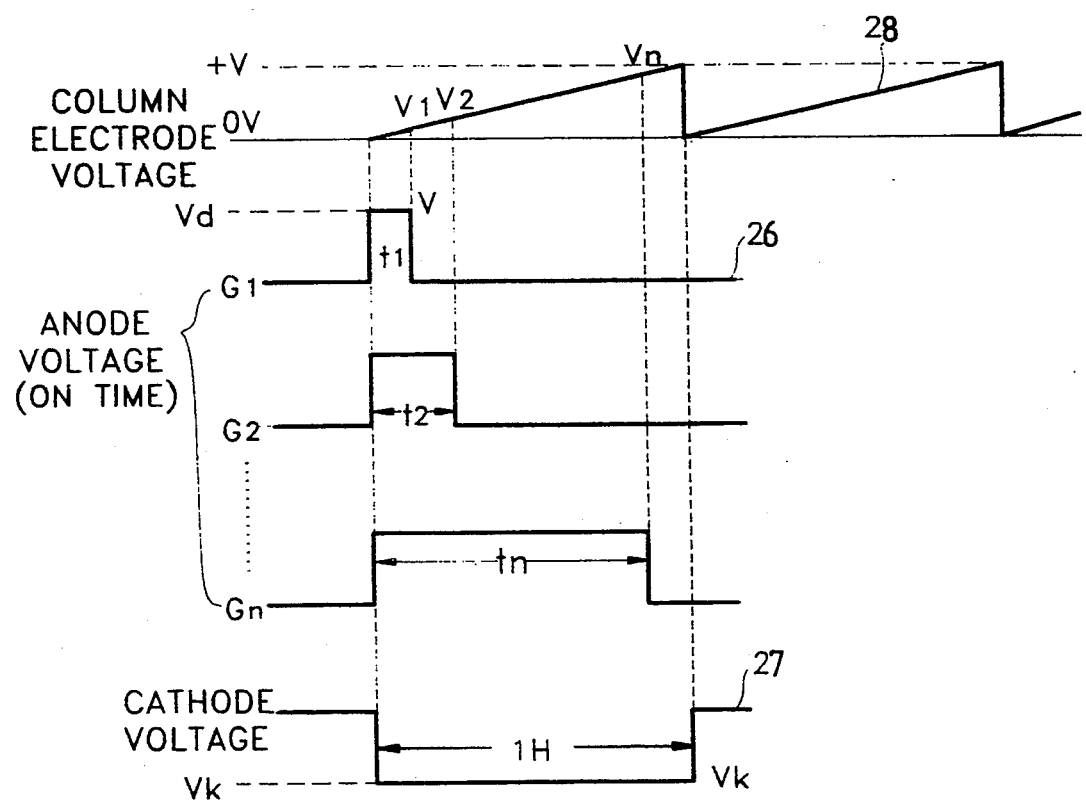
FIG. 4 shows waveforms of signals applied to respective electrodes to display the gray scale of a liquid crystal display of a plasma addressing method according to the present invention.

FIG. 4 shows waveforms of the signals supplied to respective electrodes of the liquid crystal display of a plasma addressing method according to the present invention.

Referring to FIG. 4, a data signal 26 is supplied to the data signal-supply anodes shown in FIG. 2, and a scanning signal 27 is successively supplied to the line scanning signal-supply cathodes, thereby causing discharge at an intersecting point of the electrodes. At the same time, a sawtooth waveform voltage 28 having predetermined constant peaks is supplied to the AC voltage-supply column electrodes for each horizontal period. The signal supplied to the AC voltage-supply column electrodes is not limited to the sawtooth waveform, but can be replaced with a signal whose amplitude and period change according to time (e.g., a staircase waveform). At this time, the point of intersection where discharge occurs is in an electrically conducting state. Under these conditions, a pixel is turned on, and an operational voltage, i.e., a voltage supplied to the liquid crystal, varies in accordance with the discharge sustaining time. Meanwhile, after the pixel turns on, discharge ceases and the discharging portion is completely insulated. Thus, a memory operation is carried out wherein the stored voltage is maintained until a following voltage is applied. In more detail, since data signals 26 (G1, G2 . . . Gn) are supplied to the data signal-supply anodes by pulse width modulation (PWM), selected "on" time is different for each signal. At this time, line scanning signal 27 of the line scanning signal-supply cathodes stays on during the period for one line scanning (1H), and the actual discharging time equals that of the turned-on time of the data signal-supply anodes corresponding to that of the line scanning signal-supply cathodes.

On the other hand, sawtooth waveform driving voltage 28 is supplied to the AC voltage-supply column electrodes, and the discharging time is T1 when signal G1 is supplied to the data signal-supply anodes. At this time, the value of a voltage V1 having an RC time constant is distributed to the liquid crystal and thin intermediary glass plate. Also, the discharging time is t2 when signal G2 is supplied to the data signal-supply anodes, and, at this time, the voltage supplied to the liquid crystal and thin glass is V2. In successive frames, the discharging time equals that of the preceding frame when the data signals supplied to the data signal-supply anodes are G1, G2, . . . and Gn, except that the voltage waveform supplied to the AC voltage-supply column electrodes is the reverse of the preceding waveform, thereby preventing deterioration of the liquid crystal as well as displaying a gray scale while carrying out AC driving.

Figure 5:
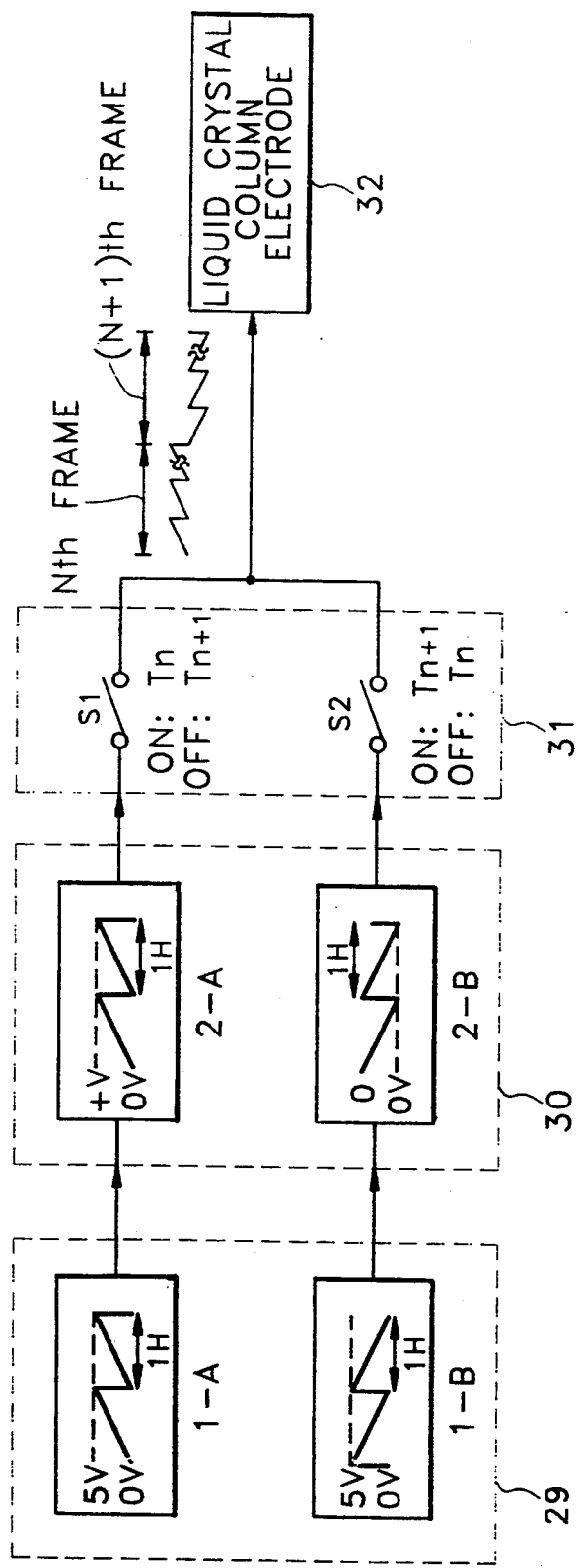
FIG. 5 is a block diagram for showing the generation of voltage waveforms supplied to the column electrodes of a liquid crystal display using a plasma addressing method according to the present invention.

FIG. 5 is a block diagram for showing the generation of the voltage waveform supplied to the column electrodes of the liquid crystal display using a plasma addressing method according to the present invention.

Referring to FIG. 5, a final waveform is obtained by amplifying the sawtooth generated from a sawtooth generator 29 through an amplifier 30, and then controlling the switching of a switching unit 31. At this time, the slope and amplitude of the sawtooth from sawtooth generator 29 can be easily varied by modifying the circuit of sawtooth generator 29. Here, each "tooth" of the final waveform is supplied for one frame by one line scanning period 1H and for scanning one line as one period. The sawtooth voltage waveform continues for one frame by the same period in the following frame, thereby maintaining AC driving.

In more detail, during one frame, after the sawtooth waveform from sawtooth generator 29 is amplified by a predetermined amplitude in a first amplifier 2-A through a first path (e.g., in the present invention, +70 V), the signal amplified in first amplifier 2-A is supplied to AC voltage-supply column electrodes 32 by turning on a first switch S1 and turning off a second switch S2. Then, for one following frame, after the sawtooth waveform generated from sawtooth generator 29 is inverted and amplified to have a predetermined amplitude (e.g., in the present invention, −70 V) in a second amplifier 2-B through a second path, the signal inverted and amplified in second amplifier 2-B is supplied to AC voltage-supply column electrodes 32 by reversing the driving of first and second switches S1 and S2.

Therefore, according to the liquid crystal display using a plasma addressing method according to the present invention, since a liquid crystal display using the plasma addressing method can be operated by the driving IC for plasma only and without requiring an additional driving IC to drive the liquid crystal portion, the driving circuit for driving the liquid crystal display using a plasma addressing method can be simplified, so that the display's response is enhanced, manufacture is simplified, and manufacturing cost is reduced. Further, plasma discharge can uniformly occur by processing all the scanning and data signals in the plasma portion. Also, the driving voltage applied to the liquid crystal portion can be adjusted as desired, which allows the intermediary plate to be thicker than the conventional plate when raising the driving voltage, so that the difficulty in manufacturing the thin glass can be overcome. Further, the plasma discharging time is changed by supplying the data signals generated by pulse width modulation to the anodes, and the voltage applied to the liquid crystal varies in accordance with the variance of the discharging time to rearrange the liquid crystal, thereby producing a gray scale display. Thus, the gray scale can be displayed in proportion to the change of the pulse width and the slope and amplitude of the sawtooth waveform. As a result, high gray-scale resolution is facilitated by enhancing the gray-scale display capacity.

It will be apparent that many modifications and variations could be effected easily by one skilled in the art without departing frown the spirit or scope of the novel concepts of the present invention.

What is claimed is:

1. A method for driving a liquid crystal display using a plasma addressing method including a face plate, an intermediary plate, and a rear plate sequentially arranged and spaced apart from each other by predetermined distances; a liquid crystal material disposed between said face plate and said intermediary plate for displaying an image; a discharge gas sealed between said intermediary plate and said rear plate for establishing a discharge in said discharge gas rearranging said liquid crystal material and thereby displaying an image; a plurality of parallel AC voltage-supply column electrodes disposed on said face plate between said face plate and said intermediary plate for receiving a constant amplitude AC voltage; a plurality of parallel data signal-supply anodes disposed on said rear plate facing said intermediary plate and generally parallel to said column electrodes for receiving data signals; and a plurality of parallel line scanning signal-supply cathodes insulated from and at right angles to said data signal-supply anodes and electrically insulated from said rear plate and said data signal-supply anodes intermediate said rear plate and said intermediary plate for receiving line scanning signals, said method comprising:

amplifying a sawtooth signal generated by a sawtooth generator in a first amplifier through a first path to produce a first sawtooth waveform;

inverting and amplifying the sawtooth waveform in a second amplifier through a second path to produce a second sawtooth waveform;

supplying the first sawtooth waveform to said parallel AC voltage-supply column electrodes by closing a first switch connected to the first amplifier and opening a second switch connected to the second amplifier;

supplying the second sawtooth waveform to said parallel AC voltage-supply column electrodes by opening the first switch and closing the second switch;

supplying line scanning signals to said line scanning signal-supply cathodes; and supplying data signals having varying durations to said data signal-supply anodes, thereby adjusting the discharging state of said discharge gas at intersections of said signal-supply cathodes and said signal-supply anodes with the variable duration data signals and the line scanning signals selectively switching discharging of said discharge gas and rearranging said liquid crystal material.

2. The method for driving a liquid crystal display using a plasma addressing method as claimed in claim 1 wherein the first and second sawtooth waveforms have periods corresponding to a period of one frame for displaying one picture.

3. The method for driving a liquid crystal display using a plasma addressing method as claimed in claim 1 including displaying a picture on a display using said variable duration data signals to control discharging time while supplying the first and second sawtooth waveforms to an AC voltage-supply column electrode selected in accordance with the discharging time whereby said liquid crystal material is rearranged by variations in voltage applied to said liquid crystal material.

4. The method for driving a liquid crystal display using a plasma addressing method as claimed in claim 1 including supplying one of the first and second sawtooth waveforms to said AC voltage-supply column electrodes during scanning of one line of said line scanning signal-supply cathodes.

5. The method for driving a liquid crystal display using a plasma addressing method as claimed in claim 3 wherein said data signals are pulsed signals and including pulse width modulating the pulsed data signals.

* * * * *